US008019354B2

(12) United States Patent
Rae et al.

(10) Patent No.: US 8,019,354 B2
(45) Date of Patent: Sep. 13, 2011

(54) WIRELESS COMMUNICATIONS CONTROL IN A CONTROLLED ENVIRONMENT FACILITY

(75) Inventors: Robert L. Rae, Plano, TX (US); Peter Keahon, Dallas, TX (US); Michelle L. Polozola, Richardson, TX (US)

(73) Assignee: Securus Technologies, Inc., Dallas, TX (US)

( * ) Notice: Subject to any disclaimer, the term of this patent is extended or adjusted under 35 U.S.C. 154(b) by 999 days.

(21) Appl. No.: 11/612,198

(22) Filed: Dec. 18, 2006

(65) Prior Publication Data
US 2008/0057976 A1 Mar. 6, 2008

Related U.S. Application Data

(63) Continuation-in-part of application No. 11/356,734, filed on Feb. 17, 2006.

(51) Int. Cl.
*H04W 24/00* (2009.01)
(52) U.S. Cl. ............... 455/456.1; 455/456.2; 455/456.3; 455/456.4; 455/456.5; 455/456.6; 370/328; 370/338
(58) Field of Classification Search .................. 455/410, 455/411, 41.2, 456.1, 456.2, 456.3, 456.4, 455/456.5, 456.6; 370/328, 338
See application file for complete search history.

(56) References Cited

U.S. PATENT DOCUMENTS

| | | | |
|---|---|---|---|
| 5,305,468 A | 4/1994 | Bruckert et al. | |
| 6,085,096 A | 7/2000 | Nakamura | |
| 6,128,507 A | 10/2000 | Takai | |
| 6,188,883 B1 | 2/2001 | Takemura | |
| 6,343,213 B1 | 1/2002 | Steer et al. | |
| 6,438,385 B1 | 8/2002 | Heinonen et al. | |
| 6,490,455 B1 | 12/2002 | Park et al. | |
| 6,496,104 B2 | 12/2002 | Kline | |
| 6,832,093 B1 | 12/2004 | Ranta | |
| 7,102,509 B1 | 9/2006 | Anders et al. | |
| 7,142,524 B2 * | 11/2006 | Stanforth et al. | 370/328 |
| 7,463,907 B2 * | 12/2008 | Smith et al. | 455/562.1 |
| 7,545,795 B2 | 6/2009 | Hinsey | |
| 2001/0036821 A1 * | 11/2001 | Gainsboro et al. | 455/410 |
| 2002/0016180 A1 | 2/2002 | Derosier et al. | |
| 2006/0030318 A1 | 2/2006 | Moore et al. | |
| 2006/0063523 A1 * | 3/2006 | McFarland | 455/423 |
| 2006/0180647 A1 | 8/2006 | Hansen | |
| 2008/0129457 A1 | 6/2008 | Ritter et al. | |

OTHER PUBLICATIONS

U.S. Appl. No. 10/135,878, Viola et al.
U.S. Appl. No. 10/642,532, Robert L. Rae.
U.S. Appl. No. 11/182,625, Sidler et al.
U.S. Appl. No. 10/720,848, Viola et al.
U.S. Appl. No. 10/646,638, Kurth et al.
U.S. Appl. No. 10/360,248, Falcone et al.

(Continued)

*Primary Examiner* — Nick Corsaro
*Assistant Examiner* — Gerald Johnson
(74) *Attorney, Agent, or Firm* — Fogarty, L.L.C.

(57) ABSTRACT

Systems and methods which facilitate wireless communications within a controlled environment in a controlled manner are shown. Embodiments operate to recognize wireless communications terminating within a controlled environment facility and control one or more aspects of the communications. Embodiments also operate to detect wireless devices disposed within a controlled environment facility and determine the location of the wireless devices. Embodiments deploy one or more wireless communication nodes in communication with an information processing platform operating in association with the controlled environment facility, such that wireless devices detected by the wireless communication nodes are located by the call processing platform and wireless communications passing through the wireless communication nodes are subject to call processing by the information processing platform.

38 Claims, 4 Drawing Sheets

OTHER PUBLICATIONS

U.S. Appl. No. 10/360,442, Falcone et al.
U.S. Appl. No. 10/720,732, Viola et al.
PCT, International Preliminary Report on Patentability, Jul. 2, 2009, International Bureau of WIPO, Geneva, Switzerland.

USPTO, Office Action for U.S. Appl. No. 11/356,734 (parent application), mailed May 5, 2009.

* cited by examiner

WIRELESS COMMUNICATIONS CONTROL IN A CONTROLLED ENVIRONMENT FACILITY

CROSS-REFERENCE TO RELATED APPLICATIONS

The present application is a continuation-in-part of co-pending, commonly assigned, patent application Ser. No. 11/356,734, entitled "Wireless Communications Control In A Controlled Environment Facility," filed Feb. 17, 2006, the disclosure of which is hereby incorporated herein by reference. The present application is related to co-pending and commonly assigned U.S. patent applications Ser. No. 10/135,878 entitled "Information Management and Movement System and Method," filed Apr. 29, 2002, Ser. No. 10/642,532 entitled "Centralized Call Processing," filed Aug. 15, 2003, Ser. No. 10/720,732 entitled "Information Management and Movement System and Method," filed Nov. 24, 2003, Ser. No. 10/720,848 entitled "Information Management and Movement System and Method," filed Nov. 24, 2003, Ser. No. 11/182,625 entitled "Systems and Methods for Acquiring, Accessing, and Analyzing Investigative Information," filed Jul. 15, 2005, Ser. No. 10/646,638 entitled "System and Method for Remote Call Forward Detection and Treatment," filed Aug. 22, 2003, Ser. No. 10/360,248 entitled "System and Method for Account Establishment and Transaction Management using Interrupt Messaging," filed Feb. 7, 2003, and Ser. No. 10/360,442 entitled "Systems and Methods for Transaction Authorization Determination," filed Feb. 7, 2003 the disclosures of which are hereby incorporated herein by reference.

TECHNICAL FIELD

The present invention relates generally to wireless communications and, more particularly, to controlling wireless communications in a controlled environment facility.

BACKGROUND OF THE INVENTION

Controlled environment facilities, such as prison facilities, hospitals, nursing homes, and camps, often implement a certain amount of control with respect to various activities and transactions involving residents thereof. For example, communications into or out of such controlled environment facilities may be controlled, monitored, redirected, and/or interrupted at the direction of controlled environment facility management for security and/or business reasons.

In a prison facility, for example, telephone calls to and from inmates are typically tightly controlled and closely monitored. Accordingly, various call processing platforms have been implemented through which inmate calls into and out of a prison facility are controlled, recorded, and monitored. Such call processing platforms generally comprise a number of ports through which telephone trunks of the public switched telephone network (PSTN) are coupled to analog telephone lines associated with telephone terminals disposed in inmate accessible areas of the prison facility. Before one of the telephone terminals disposed in inmate accessible areas of the prison facility are placed in communication with the PSTN, logic of the call processing platform will make a validation determination with respect to whether the call is to be connected, such as to determine if calls are allowed at the time of the call, if calls are allowed to or from the particular telephone terminal, etcetera.

Wireless communications devices, such as cellular telephones, provide a means by which residents of a controlled environment facility may establish communications which do not pass through a call processing platform of the controlled environment facility. For example, although disposed within the confines of a prison facility, an inmate may use a cellular telephone to call an individual outside of the prison facility without the call being detected or controlled by a prison facility call processing platform. It is believed that between 1-10% of all calls being completed from prison facilities in the United States are presently being made using contraband cellular telephones. Such calls may present a security risk, may defeat a business goal of the controlled environment facility, etcetera.

For example, calls from contraband wireless devices are not being recorded, monitored, or controlled. Accordingly, there is a potential for harassment with calls being made to restricted numbers (e.g., victims, witnesses, judges, etcetera), the coordination of external/internal illegal business operations from within the facility, gang activity being coordinated from within facilities, riots or other activities being coordinated within and between facilities, and/or the general loss of command and control by facility leadership. Without the calls being monitored and recorded, calls made with contraband wireless devices reduce the effectiveness of the investigatory process.

Moreover, a controlled environment facility and/or service provider may have expended appreciable amounts of capital and resources to deploy a call processing system for safely and securely facilitating the privilege of residents placing and receiving calls. It may be expected that this investment is to be recouped through a surcharge or tariff on all resident's calls placed into or out of the controlled environment facility. However, as calls made using contraband cellular telephones bypass the call processing platforms typically relied upon to implement such a surcharge or tariff, the controlled environment facility and/or service provider may be unable to recover expected costs.

Accordingly, cellular telephones and other wireless communication devices are often prohibited within controlled environment facilities. In particular, the possession of wireless devices is prohibited within all prison facilities in the United States, and possession of wireless devices is a felony in three states. However, inmates have proven resourceful in having cellular telephones, or the components thereof, brought into prison facilities for use in placing and receiving unauthorized communications.

Various attempts have been made in addition to the aforementioned legal deterrents to discourage the use of wireless communications devices in controlled environment facilities. For example, prison facilities have often utilized thorough and concentrated searches, often referred to as "shakedowns," to find contraband items including wireless communication devices within the facility. However, such searches are highly resource dependent. With budget dollars becoming tighter every year, this correctional officer function is competing against many other responsibilities and appears to be losing emphasis. Some prison facilities have utilized detecting devices to reduce the manpower and/or increase the effectiveness of attempts to locate wireless devices within the facility. However, such detecting devices generally require expensive technology to be deployed that still require a significant of administration and/or correctional officer time for monitoring and intervention.

Additionally, transmission of interference signals to block wireless communications has been suggested to discourage or prevent the use of wireless communications in controlled environment facilities. However, transmission of interference signals is problematic for a number of reasons. Radio spectrum is highly regulated in most countries and the transmission of interference signals is often prohibited or highly regulated in order to prevent arbitrary interruption of wireless communication. Moreover, some wireless communications technologies, such as spread spectrum code division multiple access (CDMA), are resistant to interference, often requiring broadband high energy interference signals in order to achieve meaningful blocking of communications. Such interference signals are costly and difficult to generate and effectively illuminate a controlled environment facility to provide effective blocking of communications.

Another attempt to discourage the use of wireless communications devices in secure areas is shown in United States patent publication number US 2002/0016180 A1 to Derosier (hereinafter Derosier). Derosier teaches the use of control signals to cause a cellular telephone to lower its transmission power so that transmissions from the cellular telephone do not reach any corresponding surrounding base stations. Such technology may be utilized to block cellular telephone use without substantial administration and/or correctional officer interaction. However, such technology does not provide any information with respect to the location of the cellular telephone or its attempted use.

BRIEF SUMMARY OF THE INVENTION

The present invention is directed to systems and methods which facilitate wireless communications within a controlled environment in a controlled manner. Embodiments of the present invention operate to recognize wireless communications, whether voice, text, video, or data, terminating within a controlled environment facility, whether outbound or inbound, and control one or more aspects of the communication using an information processing platform or other communication control system. The present invention is also directed to systems and methods which detect wireless communication devices, whether cellular telephones, personal digital assistants (PDAs), wireless network devices, two-way pagers, press-to-talk personal communication services (PCS) devices, etcetera, within a control environment facility, and determine the location of the wireless device using an information processing platform or other communication control system.

Embodiments of the invention provide a controlled alternative for wireless communication within a controlled environment facility, such as a prison facility (e.g., jail, stockade, prison, penitentiary, etcetera), hospitals, nursing homes, camps, and/or the like, that otherwise would not be permitted and may have actively been prevented. In addition to providing a higher number of calls through an information processing platform, thereby increasing revenues for the service provider and/or commissions for the controlled environment facility, embodiments of the invention provide improved investigatory tools for the controlled environment facility through controlling, monitoring, redirecting, and/or interrupting wireless communications. Accordingly, embodiments operate to provide expanded communications opportunities for the residents of controlled environment facilities while expanding both investigatory and revenue potential for the facility. Moreover, using systems and methods of the present invention, law enforcement is provided a choice in how wireless connections are managed within a controlled environment facility.

In facilitating wireless communications within a controlled environment facility, embodiments of the present invention deploy one or more wireless communication nodes, such as may comprise a wireless base station, a wireless micro-cell, a wireless pico-cell, and/or the like, in association with a controlled environment facility. Such wireless communication nodes are adapted to "illuminate" (i.e., provide radio frequency (RF) signal coverage) areas of the controlled environment facility occupied by residents, such as prison cells or rooms, common areas, lounges, dining facilities, offices, exercise rooms, grounds, and/or the like. The wireless communication nodes are preferably in communication with an information processing platform operating in association with the controlled environment facility, such that wireless communications passing through the wireless communication nodes are subject to call processing by the information processing platform. Wireless communication devices, such as cellular telephones, personal digital assistants (PDAs), wireless network devices (e.g., a personal computer having a wireless local area network (WLAN) network interface), two-way pagers, press-to-talk personal communication services (PCS) devices, etcetera, will preferably establish communications with a wireless communication node of the present invention due to the wireless communication node providing a best signal, being the nearest wireless access point, providing the strongest or only signal within the controlled environment facility, etcetera. Accordingly, communications terminating with a resident's wireless communication device may be controlled, monitored, recorded, redirected, interrupted, released, etcetera in accordance with the information processing platform algorithms.

Wireless communication nodes of embodiments of the invention adapt the radiation pattern of an antenna system thereof to adequately cover desired areas within the associated controlled environment facility (e.g., all areas of the controlled environment facility accessible by residents and/or personnel). For example, using multiple directional beam antenna systems, phased array antenna systems, adaptive array antenna systems, and/or the like, wireless communication nodes of embodiments adequately illuminate desired areas within the controlled environment facility (e.g., penetrate walls, cover multiple levels or floors, cover perimeter areas, etcetera) to facilitate wireless communications according the present invention. Such radiation patterns are preferably carefully controlled to provide the aforementioned desired coverage without illuminating areas external to the controlled environment facility sufficiently to cause undesired interference or interaction with wireless devices utilized external to the controlled environment facility.

Additionally or alternatively, wireless communication nodes of embodiments of the present invention deployed in association with a controlled environment facility may comprise a detection device suitable for detecting one or more wireless devices (e.g., such as cellular telephones, PDAs, wireless network devices, two-way pagers, press-to-talk PCS devices, etcetera). Such wireless communication nodes are adapted to "monitor" (i.e., provide radio frequency (RF) signal detection) areas of the controlled environment facility occupied by residents (or even areas which are "off limits" to some or all residents), such as prison cells or rooms, common areas, lounges, dining facilities, offices, exercise rooms, grounds, and/or the like. The wireless communication nodes are preferably in communication with an information processing platform in association with the controlled environment facility, such that data associated with wireless communication devices obtained and/or determined by the wireless communication nodes is sent to the information processing platform.

A wireless communication device will emit a signal, such as an RF signal, on power-up and/or when placing or receiving calls. Wireless communication nodes of embodiments will detect the signal emitted by the wireless communication device and will preferably collect data associated with the device, the user of the device, the operation of the device, and/or the location of the wireless communication device. The collected data may comprise data acquired initially from the signal, such as signal strength or relative delay, and/or data obtained by processing the initially acquired data at least in part, such as an approximate location of the wireless device. Wireless communication nodes of embodiments may communicate the collected data to the information processing platform. Accordingly, the location of a resident's wireless communication device may be determined in accordance with the logic of the information processing platform. Additionally or alternatively, wireless communication nodes of embodiments may determine the location of a resident's wireless communication device, such as by triangulation methods, and communicate the location of the wireless communication device to the information processing platform.

Wireless communication nodes of embodiments of the present invention may operate under any wireless network specification, such as Bluetooth, ZigBee, Wi-Fi, and/or the like, to communicate with each other and/or an information processing platform operating in association with a controlled environment facility. Wireless communication nodes of preferred embodiments of the present invention operate under the ZigBee specification. ZigBee is the name of a specification for a suite of high level communication protocols using small, low-power digital radios based on the IEEE 802.15.4 for wireless personal area networks (WPANs).

Embodiments of the present invention deploy a plurality of wireless communication nodes, e.g., operable under the ZigBee specification, in association with a controlled environment facility. Such wireless communication nodes are adapted to illuminate and/or monitor areas of the controlled environment facility. Preferably, the wireless communication nodes are operable to communicate with any other wireless communication nodes within range thereby forming a multi-path mesh network of wireless communication nodes. Accordingly, information can be routed from a wireless communication node to a desired destination, such as another wireless communication node and/or an information processing platform, through any number of paths permitting poorly performing wireless communication nodes or routes to be by-passed.

The wireless communication nodes of embodiments of the present invention can remain "awake" (i.e., active or on) at all times, but preferably some of the wireless communication nodes will be "awake" while the other wireless communication nodes will be "asleep" (i.e., dormant or off) to conserve power. Embodiments of the present invention support a sequence of wireless communication nodes alternating between awake and sleep modes such that at least a certain percentage of the wireless communication nodes are awake at any given time.

Wireless communication nodes of embodiments of the present invention are adapted to monitor areas of the controlled environment facility. A signal emitted by a wireless device is detected by one or more of such wireless communication node within range. The one or more wireless communication node preferably communicates with one or more neighboring wireless communication node to "wake up" (i.e., activate or turn on) the one or more neighboring wireless communication node in sleep mode and/or alert the one or more neighboring wireless communication node that there is a wireless device nearby. The one or more wireless communication node collects data associated with the location of the wireless communication device. The collected data may comprise data acquired initially from the signal, such as signal strength or relative delay, and/or data obtained by processing the initially acquired data at least in part, such as an approximate location of the wireless device. The collected data is preferably routed by the one or more wireless communication node to one or more gateway wireless communication node, which communicates the collected data to an information processing platform. Accordingly, the location of a resident's wireless communication device may be determined in accordance with the logic of the information processing platform. Additionally or alternatively, the location of the wireless communication device may be determined by the one or more wireless communication node and the location communicated to the information processing platform.

Embodiments of the invention place an information processing platform operating in association with the controlled environment facility in communication with a wireless communication network access point, such as a cellular network base station. Accordingly, where such a wireless communication network access point illuminates all or any portion of a controlled environment facility, wireless communications utilizing the network access point terminating with a resident's wireless device may be controlled in accordance with the information processing platform algorithms. The use of wireless communication network access points in providing wireless communications with respect to controlled environment facilities according to embodiments of the invention may be in addition to or in the alternative to the use of the aforementioned wireless communication nodes.

Embodiments of the present invention may operate to facilitate wireless communications and/or locating wireless devices in a variety of modes. For example, embodiments of the invention may operate in a stealth mode such that a wireless device communication is completed without a party to the communication realizing the communication has been handled by an information processing platform in association with a controlled environment facility. In such a stealth mode various controlled environment call processing features, such as call interception, recording, monitoring, locating, re-routing, etcetera, may be implemented without the calling and/or called party's knowledge. Additionally or alternatively, a public mode may be provided to announce or otherwise make public that wireless communications or particular wireless communications are subject to control (e.g., including interception, recording, monitoring, locating, re-routing, etcetera) by an information processing platform in association with a controlled environment facility. Embodiments of the invention may additionally or alternatively operate in a conversion mode such that wireless device communications within the controlled environment are converted to operation according to other communications processed by an information processing platform in association with a controlled environment facility. Accordingly, wireless devices, whether or not such wireless devices are a priori known to the information processing platform, may operate essentially as another station of the controlled communication services when disposed in areas of the controlled environment facility.

It should be appreciated that embodiments of the present invention may leverage the use of call processing systems already deployed for use with respect to wireline communications. For example, a wireless call may be treated using the same algorithms as a wireline call, such as to determine if the called and/or calling number is allowed, to determine if calls are allowed at the current time of day, to determine if an account is available for funding the account, to determine if the call is to be recorded, to determine if an investigator should be notified of or placed on the call, etcetera.

Additionally or alternatively, an information processing platform may implement call treatment algorithms unique to wireless communications. For example, an information processing platform may be adapted according to embodiments of the invention to identify particular wireless communication devices, such as through reference to an electronic serial number (ESN), mobile identification number (MIN), electronic address (e.g., telephone number, electronic mail address, uniform resource locator (URL), internet protocol (IP) address, etcetera), and/or the like and to prevent communications using wireless devices which are not properly registered with the information processing platform. Communications to or from such unregistered wireless communication devices may be redirected to a system, such as may comprise an agent, an interactive voice response (IVR) unit, a text message delivery unit, etcetera, to provide one or more parties to the communication information with respect to why the communication is not being completed and/or how the wireless device may be registered or how a registered wireless device may be obtained.

Additionally or alternatively, information processing platforms of the present invention may operate to collect information, such as a location of the wireless communication device within the controlled environment facility (such as may be determined using radio location techniques, directional antenna beam information, global positioning system (GPS) information available from the wireless communication device, etcetera), a dialed number, a voice sample of a party attempting the call, and/or the like, for investigative purposes while either allowing or blocking a wireless communication attempt associated with unregistered wireless communication devices. Embodiments of the invention may operate to display messages on the wireless device to indicate that the device is in a controlled state. Likewise, messages may be appended to communications made using wireless devices, such as to announce that the device is being operated in a controlled area and communications are subject to tracing, monitoring, and recording.

According to embodiments of the invention, wireless communication services may continue to be offered and provided to residents of the controlled environment facility using a registered wireless communication device by the service provider after the resident leaves the controlled environment facility. Accordingly, not only may wireless communications be facilitated in association with a controlled environment facility according to the present invention, but wireless communications independent of the controlled environment facility may also be facilitated.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

To aid in understanding of the concepts of the present invention, embodiments will be described herein with reference to a prison facility. It should be appreciated, however, that the present invention is not limited to application with respect to prison facilities and may readily be applied to a variety of controlled environment facilities, such as hospitals, nursing homes, camps, dormitories, campuses, etcetera.

Figure 1:
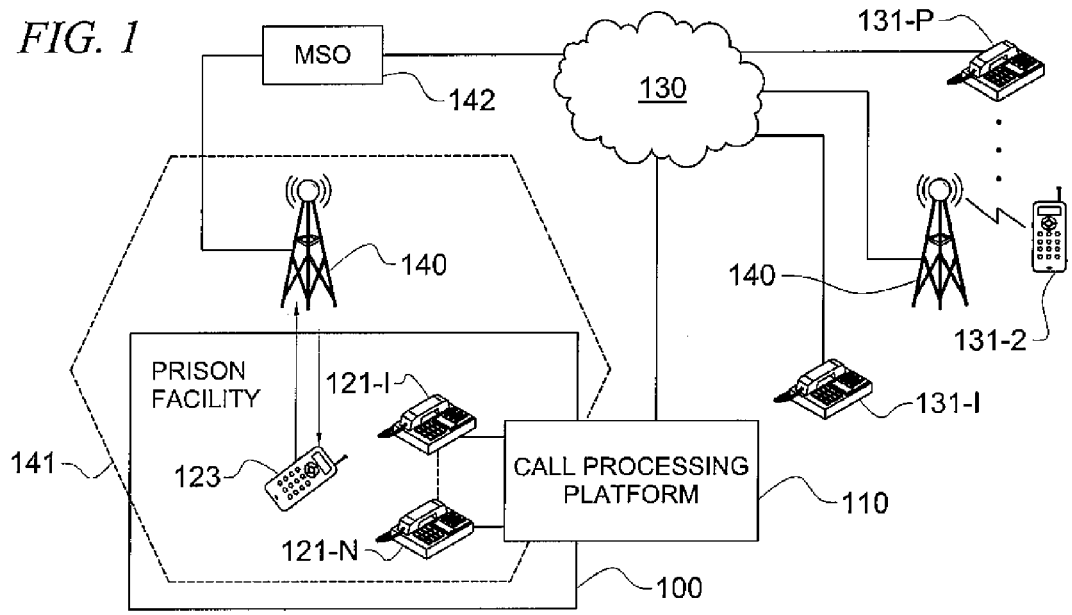
FIG. 1 shows a block diagram of a controlled environment facility information processing platform wherein a wireless communication device is operable to avoid communication processing treatment.

Directing attention to FIG. 1, a block diagram illustrating how a wireless communication device within a controlled environment facility may avoid locating and communication processing treatment by an information processing platform is shown. Specifically, cellular telephone 123 is shown disposed within prison facility 100. Although prison facility 100 has call processing platform 110 deployed in association therewith, providing call processing with respect to user terminals 121-1 through 121-N, cellular telephone 123 is able to establish wireless communications with network 130, such as may comprise the public switched telephone network (PSTN), the Internet, a local area network (LAN), a metropolitan area network (MAN), a wide area network (WAN), etcetera, without the communication being detected by, directed through, or controlled by call processing platform 110. Specifically, cellular telephone 123 is disposed in cell (service area or radiation pattern) 141 associated with cellular base station 140. Base station 140 is coupled to network 130 through traditional means, such as via mobile switching office (MSO) 142. Cellular telephone 123 may thus place and/or receive calls or otherwise communicate with user terminals 131-1 through 131-P disposed external to prison facility 100.

Figure 2:
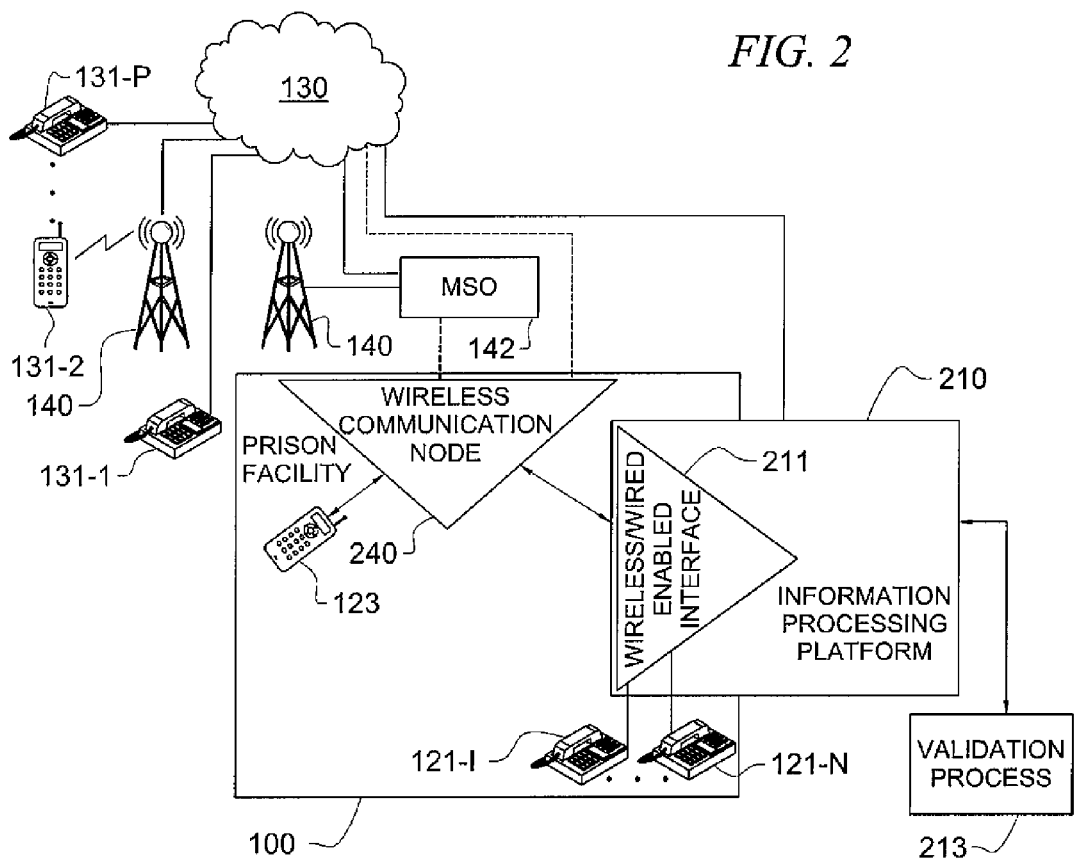
FIG. 2 shows a block diagram of a controlled environment facility information processing platform adapted to provide communication processing treatment with respect to wireless communication devices according to an embodiment of the present invention.

Referring now to FIG. 2, a block diagram illustrating an information processing platform 210 adapted to facilitate wireless communications with respect to a controlled environment facility according to an embodiment of the present invention is shown. Specifically, information processing platform 210 of the illustrated embodiment includes wireless/wired enabled interface 211 to support interfacing with, processing, and/or locating wireline and wireless communication devices. It should be appreciated that, although cellular telephone 123 is shown as the wireless user terminal illustrated in FIG. 2, any form of wireless communication device (e.g., wireless PDAs, wireless computers, two-way pagers, press-to-talk PCS devices, etcetera) may be supported by embodiments of the present invention. Moreover, it should be appreciated that wireless communications supported according to embodiments of the invention are not limited to voice communications and, therefore, may include text messaging, short message service (SMS), instant messaging (IM), multi-media communications, facsimile transmission, electronic mail, electronic document and/or file transmission, etcetera.

User terminals 121-1 through 121-N are coupled to information processing platform 210, in the illustrated embodiment via wireless/wired enabled interface 211, and communications originating from and/or directed to these user devices are controlled by logic of information processing platform 210. Wireless user terminals are also coupled to information processing platform 210 of the illustrated embodiment via wireless/wired enabled interface 211 so that the locations of these user devices are determined by the logic of information processing platform 210 and/or communications originating from and/or directed to these user devices are controlled by logic of information processing platform 210. Additional detail with respect to controlling or otherwise processing calls using call processing systems is provided in the above reference patent applications entitled "Information Management and Movement System and Method," "Centralized Call Processing," and "Systems and Methods for Acquiring, Accessing, and Analyzing Investigative Information." Additional detail with respect to embodiments of information processing platform 210 adapted according to embodiments of the present invention is provided in FIGS. 3A and 3B.

Figure 3A:
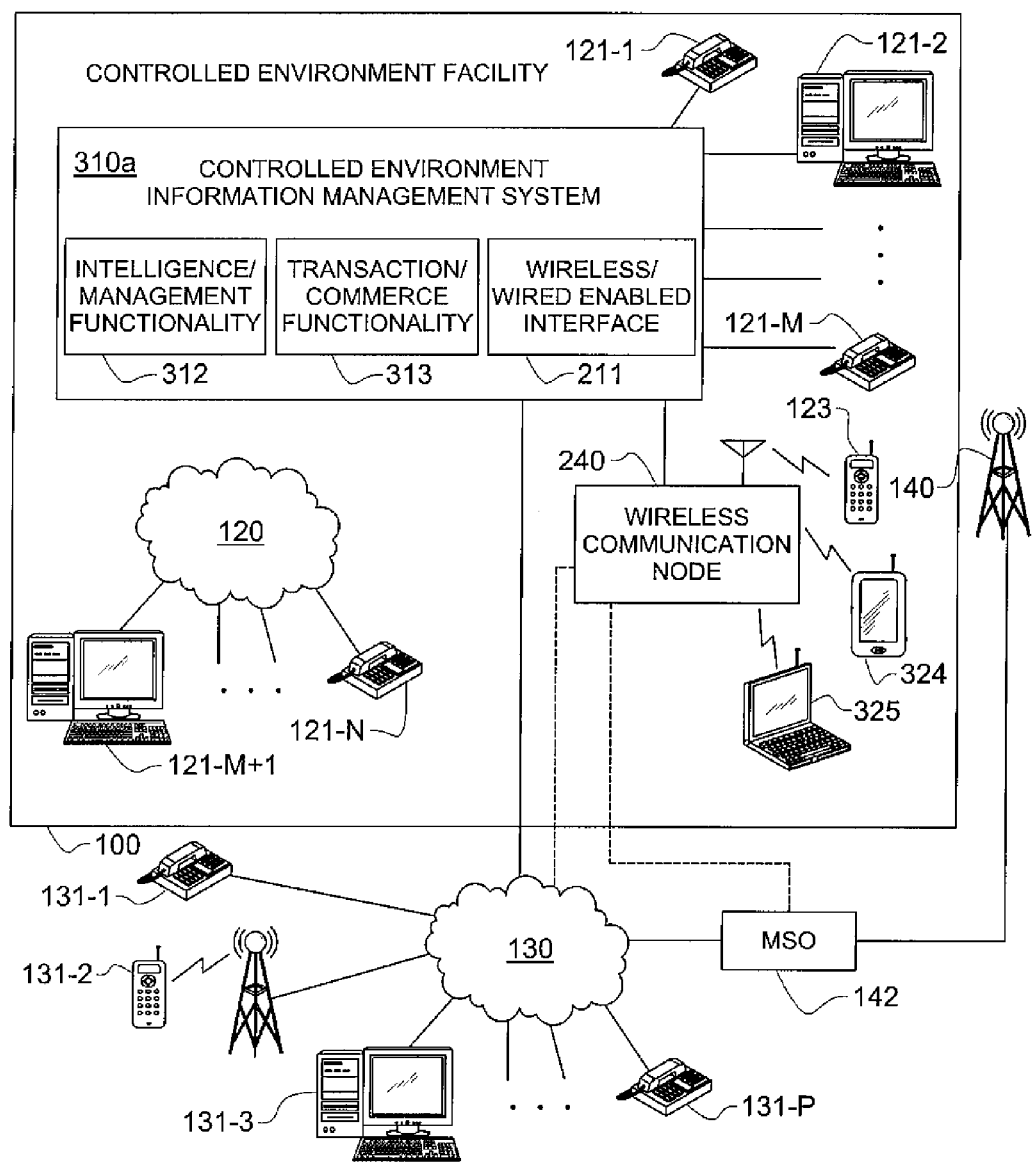
FIGS. 3A and 3B show detail with respect to information processing system architectures as may be implemented with respect to the information processing platform of FIG. 2 according to embodiments of the present invention.
Figure 3B:
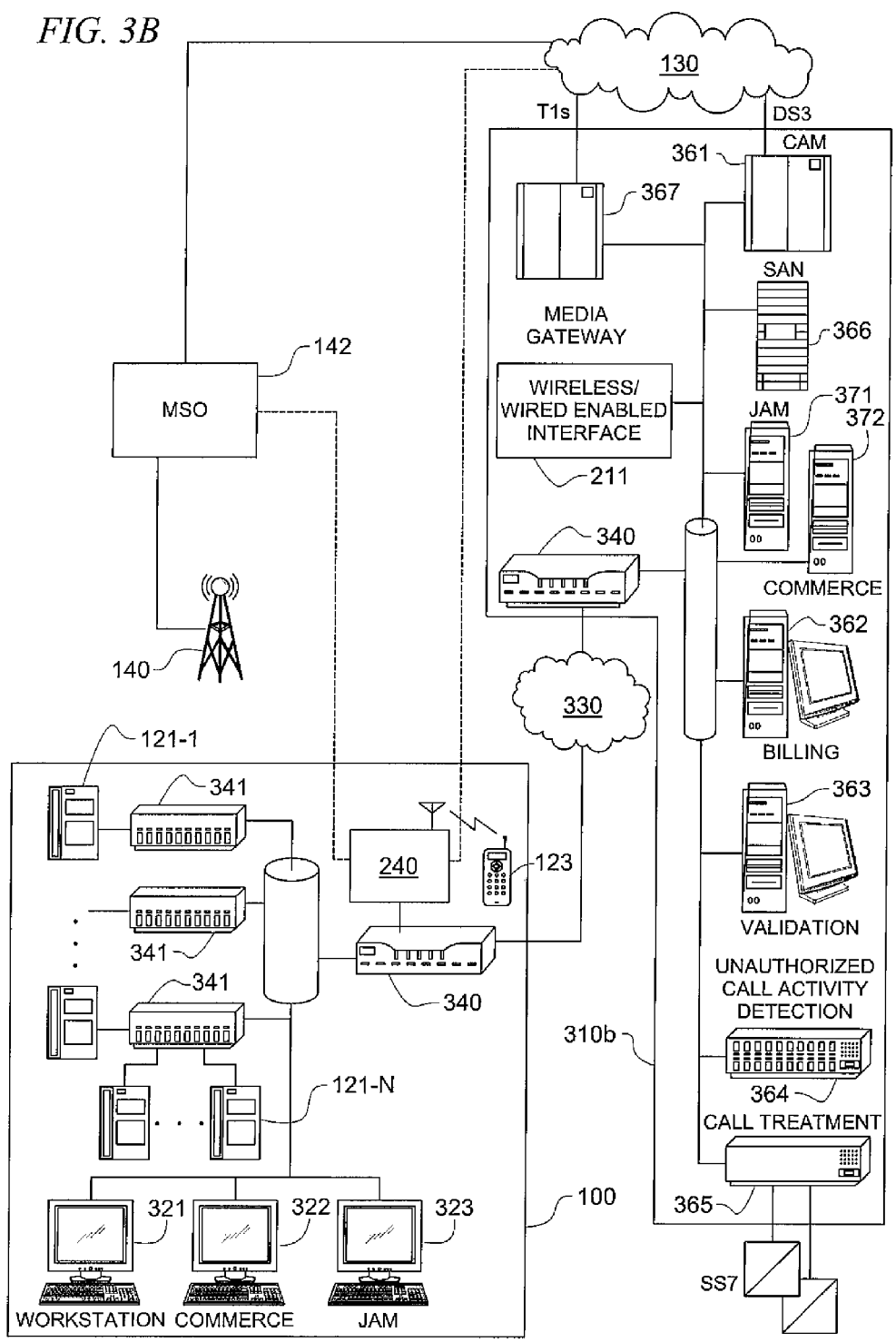

Directing attention to FIG. 3A, a controlled environment information management system 310A, preferably having functions and features as described in the above referenced patent applications entitled "Information Management and Movement System and Method," is shown adapted to provide an information processing platform facilitating wireless communications corresponding to that of information processing platform 210 of FIG. 2 according to an embodiment of the present invention. Specifically, controlled environment information management system 310A, corresponding to information processing platform 210 of FIG. 2, is deployed with respect to controlled environment facility 100. Although illustrated as being deployed within the controlled environment facility in FIG. 3A, it should be appreciated that controlled environment information management systems of the present invention may be deployed in a number of configurations. For example, embodiments of the present invention provide an information management system deployed external to the controlled environment facility and having data terminals and/or other access points deployed within the controlled environment facility, as shown in FIG. 3B. Additionally or alternatively, information management systems may be provided in a distributed topology, such as having server systems, application programs, and/or databases distributed throughout a number of geographic locals, according to embodiments of the present invention.

As shown in FIG. 3A, information management system 310A provides wireless device locating and call processing with respect to a variety of user terminal equipment configurations. For example, user terminal equipment may include personal computers (computers 121-2, 121-M+1, and 325), PDAs (PDA 324), pagers, wireline telephones (telephones 121-1, 121-M, 121-N), wireless telephones (cellular telephone 123) facsimile machines, and the like, coupled through direct links, such as wireline, cable, fiber optic, etcetera, and/or indirect links, such as network 120. In accordance with embodiments of the present invention, controlled environment information management system 310A is adapted to include intelligence/management functionality 312 and transaction/commerce functionality 313. Preferably, intelligence/management functionality 312 provides for collection, storage, and movement of information for managing various operational aspects of the controlled environment facility, including the management of personnel, residents, vendors, and resources. Transaction/commerce functionality 313 preferably provides for the instigation and completion of various transactions, including requesting and providing goods and services, determining credit worthiness, verifying account balance and status, and providing for payment. Additional detail with respect to operation of information management system 310A in providing call processing and other functionality is provided in the above referenced patent application entitled "Information Management and Movement System and Method."

Referring now to FIG. 3B, a controlled environment information management system, having functions and features as described in the above referenced patent applications entitled "Centralized Call Processing," is shown adapted to provide an information processing platform facilitating wireless communications corresponding to that of information processing platform 210 of FIG. 2 according to an embodiment of the present invention. Specifically, controlled environment information management system 310B, corresponding to information processing platform 210 of FIG. 2, is deployed within controlled environment facility 100. Information management system 310B provides wireless device locating and call processing with respect to a variety of user terminal equipment configurations using a centralized architecture. Information management system 310B of the illustrated embodiment is in communication with controlled environment facility 100 via network 330. It should be appreciated that, although only a single information management system and controlled environment facility are represented in FIG. 3B, any number of information management systems and/or controlled environment facilities may be implemented. Likewise, the configuration of information management systems and controlled environment facilities for which calling services may be provided according to the present invention is not limited to those shown in FIG. 3B.

The illustrated embodiment of information management system 310B disposes one or more call processing gateways, shown here as call processing gateways 341, at or near sites for which call processing services are to be provided, here controlled environment facility 100. Call processing gateways 341 may provide interfacing and arbitration between a number of protocols, signals, and/or interfaces. For example, preferred embodiment call processing gateways 341 provide a plurality of analog telephone line interfaces (e.g., POTS line interfaces), LAN interfaces (e.g., 100 Mbit Ethernet interface), wireless interfaces (e.g., 802.11 interface), etcetera for coupling to a plurality of user terminals, here user terminals 121-1 through 121-N. Preferred embodiment call processing gateways 341 provide at least one WAN interface (e.g., T1 interface) for coupling to a data, e.g., packet switched, network, such as to facilitate the use of management terminals (e.g., workstation 321, commerce terminal 322, and jail application manager terminal 323).

A plurality of call processing gateways 341 may be coupled to cooperate in providing call processing services using a network router or switch, such as router 340. Call processing gateways 341 of the illustrated embodiment are coupled to information management system 310B via network 330. Correspondingly, information management system 310B of the illustrated embodiment includes router/switch 340 coupling network 330 to various systems and components comprising information management system 310B.

The illustrated embodiment of information management system 310B includes a number of functional aspects, ones of which may be omitted in optional configurations, shown as various systems cooperating to provide call processing according to embodiments of the present invention. Call application management system 361, billing system 362, validation system 363, unauthorized call activity detection system 364, call treatment system 365, call recording system 366, and media gateway 367 may be utilized in various combinations to provide primary calling service functionality according to embodiments of the present invention. Justice application management system 371 and/or commerce system 372 of information management system 301B may be utilized in providing enhanced functionality, such as management of the controlled environment facility and its personnel and/or residents. Additional detail with respect to operation of information management system 310B in providing call processing and other functionality is provided in the above referenced patent application entitled "Centralized Call Processing."

Figure 4:
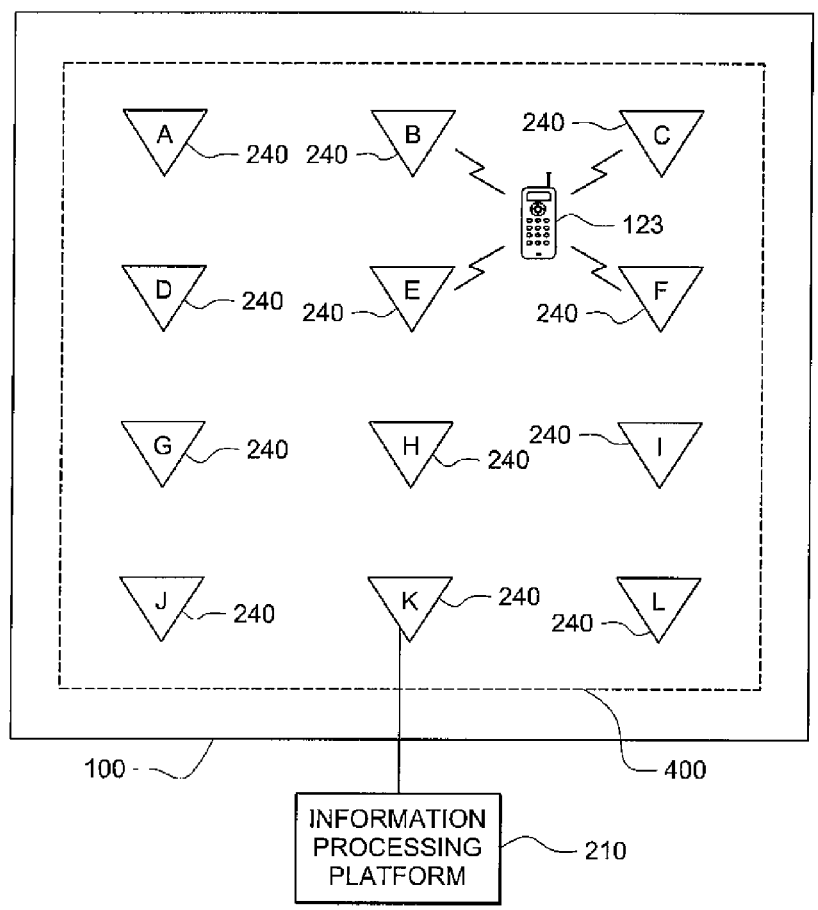
FIG. 4 shows a multi-path mesh network of wireless communication nodes in communication with the information processing platform of FIG. 2 according to an embodiment of the present invention.

Referring now to FIG. 4, wireless communication nodes 240A-240L shown disposed within prison facility 100 are operable to communicate with each other forming a multi-path mesh network of wireless communication nodes 400. Network 400 is in communication with information processing platform 210 via gateway wireless communication node 240K. An advantage of network 400 is that information can be routed through any number of paths being that each wireless communication node 240 can communicate with any other wireless communication node 240 within range, such as through use of ZigBee, IEEE 802.11, IEEE 802.16, or other wired or wireless protocols. The routing within network 400 is dynamic and intelligent. Not every wireless communication node 240 in network 400 will act as a router for every message, only those wireless communication nodes that are useful in getting the information to a desired destination. This characteristic of network 400 allows for poorly performing wireless communication nodes or routes to be by-passed providing a robust network architecture. For example, wireless communication node 240D attempts to communicate information to wireless communication node 240F via wireless communication node 240E, but wireless communication node 240E is not functioning or responding. Wireless communication node 240D can instead communicate the information to wireless communication node 240B or wireless communication 240H, and wireless communication node 240B or wireless communication 240H can route the information to wireless communication node 240F.

Figure 5:
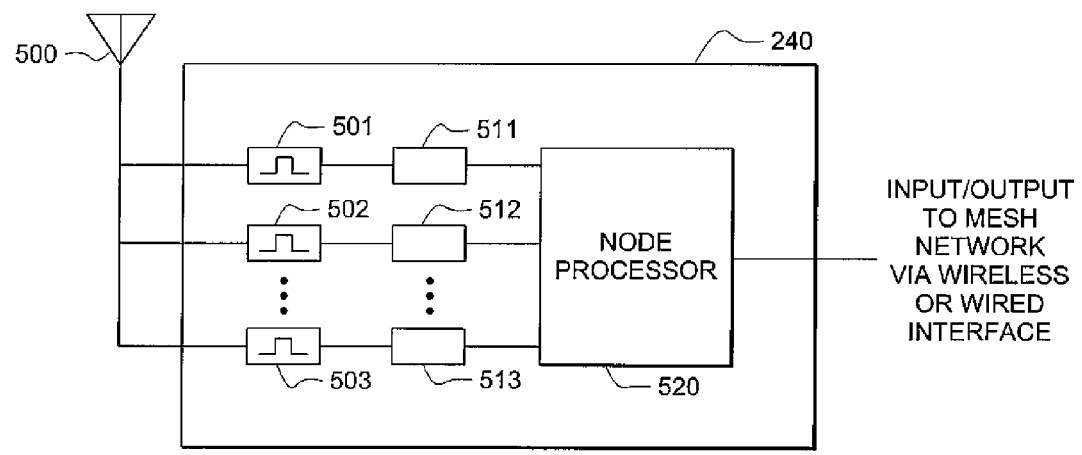
FIG. 5 shows a wireless communication node according to an embodiment of the present invention.

Referring now to FIG. 5, a block diagram illustrating a wireless communication node adapted to monitor at least a part of a controlled environment facility is shown. Specifically, wireless communication node 240 of the illustrated embodiment comprises antenna 500, filters 501-503, sensors 511-513, and node processor 520. Filters 501-503 are preferably each unique to a particular type of wireless communication to be detected by wireless communication node 240, for example each type of wireless communication operating in a specific frequency band. For example, filter 501 may comprise a filter for PCS, filter 502 may comprise a filter for WiFi, etcetera. Filters 501-503 are operable to filter out signals having frequencies outside a specific frequency band and permit signals having frequencies inside a specific frequency band to pass through. According to an illustrative embodiment, filter 501 filters out signals having frequencies outside the frequency band in which PCS wireless devices operate and permits signals having frequencies inside the frequency band to pass onto sensor 511. Sensors 511-513 each detect wireless communications operating in a particular frequency band. For example, sensor 511 detects PCS communications, sensor 512 detects WiFi communications, etcetera. Sensors 511-513 of embodiments are operable to acquire data associated with the signal detected, such as signal frequency, signal strength, relative delay, etcetera. Node processor 520 is operable to collect the data acquired by sensors 511-513. Additionally, node processor 520 may process the acquired data at least in part and collect the processed data, such as may be the type of wireless device detected, an approximate location of the wireless device, etcetera. Node processor 520 is operable to route the collected data to other wireless communication nodes and/or an information processing platform using an input/output interface in communication with the mesh network, such as may be coupled to antenna 500 or another antenna (not shown) for wireless communication. It should be appreciated that wireless communication node 240 of embodiments may comprise any number of filters and sensors as desired to provide a controlled environment facility with detection for as many different types of wireless devices as needed and/or desired.

Having described various information processing architectures that may be implemented according to embodiments of the present invention, attention is again directed to the more general block diagram of FIG. 2 and information processing platform 210. In order to facilitate information processing platform 210 locating a wireless device used by a resident thereof and/or being placed in communication with a wireless device used by a resident thereof, one or more wireless communication node is deployed in association with prison facility 100. The illustrated embodiment shows wireless communication node 240 facilitating communication between information processing platform 210 and cellular telephone 123 and facilitating the locating of cellular telephone 123.

Wireless communication node 240 may be coupled to information processing platform 210 via wireline links, wireless links, and/or any other media supporting communication as described herein. Moreover, information processing platform 210 may be disposed locally to wireless communication node 240 (such as shown in FIG. 3A) or remotely with respect to wireless communication node 240 (such as shown in FIG. 3B). In providing operation according to embodiments of the present invention, wireless communication node 240 may additionally be in communication with various devices and systems, such as MSO 140 and/or network 130, such as to provide communications between cellular telephone 123 and one or more of user terminals 131-1 through 131-P. However, communication with terminals or other systems external to prison facility 100 may be provided through information processing platform 210, according to embodiments of the invention.

Wireless communication node 240 of embodiments of the present invention comprises a wireless base station, a wireless micro-cell, a wireless pico-cell, and/or the like. One or more such wireless communication nodes are adapted to "illuminate" (i.e., provide radio frequency (RF) signal coverage) areas of prison facility 100 accessible to prisoners (or perhaps even off limits to prisoners), such as prison cells, common areas, workshops, dining facilities, exercise rooms, grounds, and/or the like. Accordingly, any location within prison facility 100 at which a prisoner is able or likely to attempt to establish wireless communications is preferably provided suitable coverage by a wireless communication node of this embodiment.

In operation according to a preferred embodiment, wireless communication devices, such as cellular telephone 123, may establish communications with wireless communication node 240 when attempting to establish wireless communications due to wireless communication node 240 being deployed to provide a best signal, being the nearest wireless access point, providing the strongest or only signal within the controlled environment facility, and/or the like. For example, although base station 140 may provide illumination of areas within prison facility 100, wireless communication node 240 of preferred embodiments provides a stronger pilot signal, special information tone (SIT), etcetera. Accordingly, when searching for a base station or other access point through which to establish communications, cellular telephone 123 may associate with wireless communication node 240 although one or more other base stations are also candidates.

Alternatively, may operate to detect wireless communication node 240 without establishing communications therewith (e.g., passively monitoring transmissions by various wireless devices). For example, wireless communication node 240 may detect an RF signal emitted by cellular telephone 123 using one of a plurality of sensors, the sensors operable to detect the different frequencies or communications protocols associated with wireless devices. Wireless communication node 240 may thus acquire data associated with the location of cellular telephone 123, such as signal strength or relative delay, and communicate this data to information processing platform 210. Accordingly, the location of cellular telephone 123 disposed within prison facility 100 may be determined in accordance with the wireless device locating algorithms of information processing platform 210.

Wireless communication node 240 preferably has the radiation pattern of an antenna system thereof adapted to adequately cover desired areas within the associated controlled environment facility suitable to cause wireless communication devices to associate with the wireless communication node rather than base station 140 or at least for detection of signals from wireless communication devices within the desired area of coverage. For example, using multiple directional beam antenna systems, phased array antenna systems, adaptive array antenna systems, and/or the like, wireless communication node 240 may transmit and receive RF signals penetrating walls, covering multiple levels or floors, covering perimeter areas, etcetera to adequately illuminate desired areas within the controlled environment facility and facilitate wireless communications according the present invention. Such radiation patterns are preferably carefully controlled to provide the aforementioned desired coverage without illuminating areas external to prison facility 100 sufficiently to cause undesired interference or interaction with wireless devices utilized external to prison facility 100.

Cooperation between wireless communication node 240 and information processing platform 210 according to embodiments of the invention operates to subject wireless communications passing through wireless communication node 240 to call processing by information processing platform 210. Accordingly, communications terminating with a wireless communication device disposed within prison facility 100 may be controlled, monitored, recorded, redirected, interrupted, released, etcetera in accordance with the call processing platform algorithms of information processing platform 210.

It should be appreciated that embodiments of the present invention may leverage the use of information processing systems already deployed for use with respect to wireline communications. For example, a wireless call may be treated using the same algorithms as a wireline call, such as to determine if the called and/or calling number is allowed, to determine if calls are allowed at the current time of day, to determine if an account is available for funding the account, to determine if the call is to be recorded, to determine if an investigator should be notified of or placed on the call, etcetera. Detail with respect to controlling calls and making call treatment determinations is provided in the above referenced patent applications entitled "Information Management and Movement System and Method," "Centralized Call Processing," "Systems and Methods for Acquiring, Accessing, and Analyzing Investigative Information," "System and Method for Remote Call Forward Detection and Treatment," "System and Method for Account Establishment and Transaction Management using Interrupt Messaging," and "Systems and Methods for Transaction Authorization Determination."

Additionally or alternatively, information processing platform 210 may implement call treatment algorithms unique to wireless communications. For example, information processing platform 210 may identify particular wireless communication devices, such as through reference to an electronic serial number (ESN), mobile identification number (MIN), electronic address (e.g., telephone number, electronic mail address, uniform resource locator (URL), internet protocol (IP) address, etcetera), and/or the like and to prevent communications using wireless devices which are not properly registered with information processing platform 210 and/or prison facility 100.

For example, communications associated with a wireless device registered with information processing platform 210 may be allowed, but information may be required by information processing platform 210 to validate the call (e.g., identify the prisoner such as by personal identification number (PIN) or speech recognition, verify a prepaid balance is available or an account is available for billing the call to, verify that the called and/or calling numbers are on an allowed number list and/or are not on a non-allowed number list, verify that the call is being placed at an allowed time and/or from an allowed location, etcetera) using validation process 213. Accordingly, wireless communication node 240 may initiate call control by capturing the call (whether inbound to a wireless communication device or outbound from a wireless communication device) and funneling this call to information processing platform 210 for continued call control.

Where a call is placed to a registered wireless communication device, wireless communication node 240 and/or information processing platform 210 may operate to manage the incoming call in a hold status as it checks to confirm that the called wireless communication device is registered, that the calling number is on an allowed number list or not on a non-allowed number list, that a prepaid balance or account is available for the call charges, and/or the like. For example, wireless communication node 240 and/or call processing platform 210 may communicate with validation process 213 to determine the foregoing. If the call is allowed, it will preferably complete with all features, capabilities, and functionality associated with information processing platform 210.

Where a call is placed by a registered wireless communication device, wireless communication node 240 and/or information processing platform 210 may communicate with validation process 213 to confirm the wireless communication device is registered, the wireless communication device and/or calling party has a status as an active account (i.e. prepaid balance available or account is live), etcetera. Information processing platform 210 preferably manages the incoming call in a hold status as it checks to confirm the call originates from a terminal on an allowed number list or is not on a non-allowed number list, that a prepaid balance or account is available for the call charges, and/or the like. If the call is allowed, it will preferably complete with all features, capabilities, and functionality associated with information processing platform 210.

It should be appreciated that although a wireless communication device is registered with information processing platform 210 and/or prison facility 100, a call associated therewith may not be allowed to complete (i.e., all or a portion of the communication may be blocked). If all or a portion of a call is blocked, information processing platform 210 of embodiments will notify the calling and/or called party with an appropriate messages based on the circumstances. For example, an IVR unit may play one or more of the following messages as appropriate: The phone number you are calling has been deactivated; Your prepaid balance is insufficient please contact a customer service representative (or the call may be transferred to an Agent or IVR script for accepting additional funds); Your prepaid balance is insufficient please try a collect call; and The line is busy, please call again.

Where a call is placed to a non-registered wireless communication device, wireless communication node 240 and/or information processing platform 210 may operate to manage the incoming call in a hold status as it checks to determine that the called wireless communication device is not registered. For example, wireless communication node 240 and/or information processing platform 210 may communicate with validation process 213 to determine that the wireless communication device is not registered with information processing platform 210 and/or prison facility 100. Wireless communication node 240 of embodiments of the invention establishes itself as a "clone" of the wireless communication device in order to terminate the call, preferably capturing call event details such as date, time of day, incoming automatic number information (ANI), dialed number information service (DNIS) information, voice sample of the calling party, and/or the like. When blocking a call to a non-registered wireless communication device, information processing platform 210 may notify the calling party and/or called party with an appropriate message based on the circumstances, such as to play one or more of the following messages: The phone you called is not registered, please advise the person you are trying to reach within ABC facility to work with the prison commissary to determine eligibility for this privilege; and A call was placed to this phone, however the phone is not registered, please contact the prison commissary to determine eligibility for wireless calling privileges.

Where a call is placed by a registered wireless communication device, wireless communication node 240 and/or information processing platform 210 may operate to manage the incoming call in a hold status as it checks to determine that the called wireless communication device is not registered. For example, wireless communication node 240 and/or information processing platform 210 may communicate with validation process 213 to determine that the wireless communication device is not registered with information processing platform 210 and/or prison facility 100. Wireless communication node 240 of embodiments of the invention establishes itself as the base station or other access point of the wireless carrier that the wireless communication device within prison facility 100 is trying to reach to complete its call to an outside party. The call will preferably be captured/blocked and wireless communication node 240 and/or information processing platform 210 may notify the calling party with an appropriate message, such as that the phone being used is not registered and that the caller should work with the prison commissary to determine eligibility for this privilege. Wireless communication node 240 and/or information processing platform 210 preferably capture call event details such as date, time of day, incoming automatic number information (ANI), ESN, MIN, dialed number information service (DNIS) information, voice sample of the calling party, GPS information, location information derived by radio location techniques, and/or the like.

Although the foregoing embodiment has been described with reference to blocking calls associated with non-registered wireless devices, embodiments of the present invention may permit some or all non-registered wireless devices to complete wireless communications. For example, embodiments of the invention may operate to operate transparent to callers such that investigative data, in the form of recorded calls, call event details, etcetera are captured for investigative purposes. An investigator or other personnel may be notified of such communications, perhaps in real-time allowing the investigator or other personnel to monitor the communication as it is transpiring.

It should be appreciated that various call event details are captured by wireless communication node 240 and/or information processing platform 210 with respect to wireless communications whether the wireless communications are allowed or blocked according to embodiments of the invention. For example, information such as date, time of day, DNIS, ANI, ESN, MIN, location information, a recording of the communication, etcetera, as available, may be captured with respect to each wireless communication terminated (either inbound or outbound) within prison facility 100. Investigative tools, such as those described in the above referenced patent applications entitled "Information Management and Movement System and Method" and "Systems and Methods for Acquiring, Accessing, and Analyzing Investigative Information," may utilize this information for robust investigative analysis and reporting.

Although embodiments described above utilize one or more wireless communication node to capture communications associated with a wireless communication device disposed in a controlled environment facility, alternative embodiments of the invention place an information processing platform operating in association with the controlled environment facility in communication with a wireless communication network access point, such as a cellular network base station. For example, information processing platform 210 may be coupled to base station 140 via MSO 142 and/or network 130. Accordingly, where such a wireless communication network access point illuminates all or any portion of a controlled environment facility, wireless communications utilizing the network access point terminating with a resident's wireless device may be controlled in accordance with the call processing platform algorithms of information processing platform 210. The use of wireless communication network access points in providing wireless communications with respect to controlled environment facilities according to embodiments of the invention may be in addition to or in the alternative to the use of the aforementioned wireless communication nodes.

Embodiments of the present invention operate to intercept all or substantially all communications (e.g., all communications determined to potentially pose a threat to safety and/or security) associated with wireless communication devices disposed in a controlled environment facility. Although there are a large number of wireless communications protocols, embodiments of the present invention need not implement each such wireless communication protocol with respect to a wireless communication node thereof to effectively capture communications. Specifically, many wireless communication devices are multi-mode and/or backwardly compatible with previous generation communications protocols. Accordingly, embodiments of the present invention may strategically implement various wireless communication protocols to in effect provide "lowest common denominator" communications useful in capturing communications from a maximum number of wireless communication devices. Moreover, embodiments of the present invention may actively control wireless communication devices, such as using control channel signaling, to operate using a particular protocol of a plurality of protocols available to the wireless communication device suitable for capturing as described herein.

Additionally or alternatively, wireless communication node 240 of embodiments of the present invention comprises a detection device operable to detect one or more wireless devices (e.g., such as cellular telephones, PDAs, wireless network devices, two-way pagers, press-to-talk PCS devices, etcetera). Such wireless communication nodes are adapted to "monitor" (i.e., provide radio frequency (RF) signal detection) areas of the controlled environment facility occupied by residents, such as prison cells or rooms, common areas, lounges, dining facilities, offices, exercise rooms, grounds, and/or the like. Accordingly, any location within prison facility 100 at which a prisoner is able or likely to power-on and/or attempt use of a wireless device is preferably provided suitable detection by a wireless communication node of this embodiment.

Wireless communication nodes 240 of embodiments of the present invention may operate under any wireless network specification, such as Bluetooth, ZigBee, WiFi, and/or the like, to communicate with each other and/or an information processing platform operating in association with a controlled environment facility. Wireless communication nodes 240 of preferred embodiments operate under the ZigBee specification.

Embodiments of the present invention operate to locate wireless communication devices present within a controlled environment facility via the deployment of a plurality of wireless communication nodes in association with a controlled environment facility. Preferably, wireless communication nodes operate under the ZigBee specification. Referring back to FIG. 4, wireless communication nodes 240 shown are adapted to monitor areas of prison facility 100. Although wireless communication nodes 240 are shown ordered evenly spaced apart from each other, wireless communication nodes 240 can be placed in any order or arrangement which results in effective monitoring of desired areas of prison facility 100. For example, an intricate, difficult area of prison facility 100, such as may comprise a prison cell ward, may be populated with a greater number of strategically placed wireless communication nodes 240 than other areas of prison facility 100. Wireless communication nodes 240 of embodiments are easy to deploy, therefore, as many wireless communication nodes 240 as needed to provide prison facility 100 with an effective wireless device surveillance may be deployed.

Wireless communication nodes 240 preferably form a multi-path mesh network of wireless communication nodes 400 which allows information to be routed from a wireless communication node 240 to a desired destination, such as another wireless communication node 240 and/or information processing platform 210, through any number of paths. Any wireless communication node 240 that is awake and within range of cellular telephone 123 is operable to detect a signal emitted by cellular telephone 123, such as an RF signal emitted when cellular telephone 123 is turned on or when a call is placed or received using cellular telephone 123. Wireless communication nodes 240B, 240C, 240E, and 240F are shown within range of cellular telephone 123. For example, wireless communication node 240C detects an RF signal emitted from cellular telephone 123. Wireless communication node 240C communicates with neighboring wireless communication nodes 240B, 240E, and 240F to wake up and/or alert the aforementioned wireless communication nodes. Wireless communication nodes 240B, 240C, 240E, and 240F collect data associated with the location of cellular telephone 123 and route the data to gateway wireless communication node 240K. Wireless communication nodes 240B, 240C, 240E, and 240F can choose any number of available paths to route the data. For example, wireless communication nodes 240B, 240C, and 240F route their data to wireless communication node 240G. Wireless communication node 240E then routes the data from wireless communication nodes 240B, 240C, and 240F, as well as its data, to gateway wireless communication node 240K via wireless communication node 240H. In another example, wireless communication node 240B routes its data to wireless communication node 240E, which in turn, routes the data received from wireless communication node 240B as well as its data to gateway wireless communication node 240K via wireless communication node 240H. Wireless communication node 240C routes its data to wireless communication node 240F, which in turn, routes its data and the data received from wireless communication node 240C to gateway wireless communication node 240K via wireless communication node 240I.

Gateway wireless communication node 240K preferably communicates the data received from wireless communication nodes 240B, 240C, 240E, and 240F to information processing platform 210. Although illustrated as being deployed external to prison facility 100 in FIG. 4, it should be appreciated that information processing platforms of the present invention may be deployed in a number of configurations. For example, embodiments of the present invention provide an information processing platform deployed external to prison facility 100 and having data terminals and/or other access points deployed within prison facility 100, and/or an information processing platform deployed within prison facility 100. Additionally or alternatively, information processing platforms may be provided in a distributed topology, such as having server systems, application programs, and/or databases distributed throughout a number of geographic locals, according to embodiments of the present invention.

Information processing platform 210 of preferred embodiments processes the data to determine the location of cellular telephone 123. Embodiments of the present invention may utilize this information to optimize operation of information processing platform 210 with respect to wireless communications within a controlled environment facility. For example, relying on the location of cellular telephone 123, infrastructure such as wireless communication network access points, wireless communication nodes, antennas, etcetera may be deployed or adjusted to intercept communications of cellular telephone 123. Additionally or alternatively, cellular telephone 123 may be confiscated. It should be appreciated that information processing platform 210 collects information with respect to the location of wireless devices disposed within prison facility 100. Investigative tools, such as those described in the above referenced patent applications entitled "Information Management and Movement System and Method" and "Systems and Methods for Acquiring, Accessing, and Analyzing Investigative Information," may utilize this information for robust investigative analysis and reporting.

In operation according to a preferred embodiment, wireless communication node 240 will detect an RF signal emitted by cellular telephone 123 due to wireless communication node 240 comprising a filter and sensor specific to PCS communications, as shown in FIG. 5. A signal emitted by cellular telephone 123 will be picked up by antenna 500 and split to the different pathways leading to filters 501-503. Filters 502 and 503, which are not filters unique to PCS communications, will filter out the signal emitted by cellular telephone 123. Filter 501 comprises a filter unique to PCS communications and will let the signal pass to sensor 511. Sensor 511 will acquire data associated with the signal that can be used to determine the location of cellular telephone 123, such as signal frequency, signal strength, relative delay, etcetera. Node processor 520 will collect data associated with the location of cellular telephone 123 and communicate this data to information processing platform 210 using antenna 500. The collected data may comprise data acquired by sensor 501 and/or data obtained by node processor 520 processing initially acquired data at least in part, such as an approximate location of wireless device 123. Accordingly, the location of cellular telephone 123 disposed within prison facility 100 may be determined in accordance with the wireless device locating algorithms of information processing platform 210.

Embodiments of the present invention may operate to facilitate wireless communications in a variety of modes. An embodiment of the invention operates in a stealth mode such that a wireless device communication is completed without a party to the communication realizing the communication has been or is being handled by information processing platform 210. Accordingly, in stealth mode various controlled environment information processing features, such as call interception, blocking calls to disallowed numbers, verifying the call is being placed to an allowed number, recording, monitoring, locating, re-routing, etcetera, may be implemented without the calling and/or called party's knowledge.

A public mode is provided according to embodiments to announce or otherwise make public that wireless communications are subject to processing, such as may include interception, blocking calls to disallowed numbers, verifying the call is being placed to an allowed number, recording, monitoring, locating, re-routing, etcetera, by information processing platform 210. For example, information processing platform may operate to cause a message to be displayed (e.g., text and/or graphics presented on a display screen of one or more user terminal, such as a wireless device and/or a device in communication with the wireless device) or announced (e.g., playing an audio message and/or tone on one or more user terminal, such as a wireless device and/or a device in communication with the wireless device) to indicate that a device and/or communications made therewith are subject to processing by information processing platform 210. Messages may be appended to communications made using wireless devices, such as to announce that the device is being operated in a controlled area and communications are subject to tracing, monitoring, recording, and/or locating.

Additionally or alternatively, embodiments of the invention provide a conversion mode of operation wherein wireless device communications within the controlled environment are converted to operation according to other communications processed by information processing platform 210. Accordingly, wireless devices, whether or not such wireless devices (e.g., cellular telephone 123) are a priori known to the information processing platform 210, may operate essentially as just another user terminal (e.g., user terminals 121-1 through 121-N).

Although wireless communication nodes 240 may be externally powered, such as by line power, wireless communication nodes 240 of embodiments are preferably internally powered, such as by an internal battery. Wireless communication nodes 240 of embodiments of the present invention can remain awake at all times. However, some of the wireless communication nodes 240 will preferably be awake while other wireless communication nodes 240 will be "asleep" to conserve power. Embodiments of the present invention support a sequence of wireless communication nodes 240 alternating between awake and asleep modes such that at least a certain percentage of the wireless communication nodes are awake at any given time. Preferably, the sequence distributes the wireless communication nodes 240 in awake mode at any given time such that the areas illuminated and/or monitored at that time are distributed throughout prison facility 100. Wireless communication nodes 240 may wake up to illuminate and/or monitor prison facility 100 for a very short amount of time, such as a millisecond, before returning to sleep mode.

Wireless communication nodes 240 of embodiments are easy to deploy, therefore, as many wireless communication nodes 240 as desired and/or needed to provide a controlled environment facility with effective wireless device locating and/or wireless communication processing may be deployed. Numerous wireless communication nodes 240 of embodiments may be deployed in various locations in association with the controlled environment facility. Preferably, wireless communication nodes 240 of preferred embodiments are deployed in strategic locations to provide the controlled environment facility with effective wireless device locating and/or wireless communication processing. Wireless communication nodes 240 of embodiments may be deployed as stationary wireless communication nodes, mobile wireless communication nodes, or a combination of both. Stationary wireless communication nodes are deployed in association with one or more stationary entities having fixed locations (e.g, walls, ceilings, tables, chairs, beds, poles, fences, telephones, and/or the like) in association with the controlled environment facility. Preferably, stationary wireless communication nodes are attached to stationary entities within the controlled environment facility. Mobile wireless communication nodes are deployed in association with one or more mobile entities having mobile locations (e.g., personnel, residents, portable devices, vehicles, and/or the like) in association with the controlled environment facility. Preferably, mobile wireless communication nodes are attached to mobile entities within the controlled environment facility.

Where wireless communication node 240 of embodiments is visible in a controlled environment facility it is preferably disposed in a hardened case. If wireless communication node 240 is concealed, such as in a wall cavity or utility conduit, it is preferably constructed to tolerate harsh elements and continue to function with no degradation of performance. For example, wireless communication nodes 240 of embodiments are designed to withstand humidity consistently greater than 80% and temperatures that consistently exceed 110 degrees. Wireless communication nodes 240 of embodiments utilize a case and wiring hardened to resist animal intrusions. In operation, a malfunction by a wireless communication node is preferably recognized by information processing platform 210 within 15 minutes, and a not functioning status of a wireless communication node is preferably recognized by information processing platform 210 within 5 minutes. In addition to providing wireless communications with wireless communication devices, wireless communication nodes 240 of embodiments are preferably adapted to independently store and deliver a short menu of messages or voice prompts.

Wireless communication nodes 240 of embodiments of the present invention can facilitate functionality other than or in addition to wireless device location and/or wireless communications processing to a controlled environment facility. For example, wireless communication nodes 240 can comprise a sensor, such as a motion sensor to monitor areas for movement within prison facility 100. It should be appreciated that wireless communication nodes 240 of embodiments are not limited to routing data to information processing platform 210. Information processing platform 210 may communicate information and/or instructions to wireless communication nodes 240 of embodiments. Such wireless communication nodes 240 may be employed for monitoring and/or controlling lock statuses, HVAC, lights, smoke detectors, etcetera, within prison facility 100.

It should be appreciated that leveraging the use of preexisting systems according to embodiments of the present invention is not limited to use of information processing systems already deployed for use with respect to wireline communications. For example, embodiments of the present invention adapt various preexisting systems to aid in locating and/or identifying wireless devices, such as non-registered wireless communication devices. Some detention facilities have begun implementing devices for detecting cellular telephones within the detention facility. However, the effectiveness of such detection devices has been limited due to their only being able to detect cellular telephones in very near proximity to the detection device when the cellular telephone is activated. Currently many detention facilities utilize radio frequency identification (RFID) bracelets to locate inmates within the facility. These bracelets are substantially permanently associated with an inmate, are tamper-resistant, and house a transmitter used to identify and locate the wearer.

Embodiments of the present invention adapt the aforementioned RFID bracelets (e.g., all the RFID bracelets or a subset of the RFID bracelets) to include a detection device. The detection device may comprise any detection device suitable for detecting one or more wireless devices (e.g., such as cellular telephones, PDAs, wireless network devices, two-way pagers, press-to-talk PCS devices, etcetera), including wireless communication node 240 of embodiments of the present invention. Accordingly, a detection device will be disposed in very near proximity to various inmates and thus opportunity to detect a non-registered wireless device is increased. Moreover, as the RFID bracelet is tamper resistant, the detection device is afforded protection even if its presence is known to the inmate population. A transmitter of the RFID bracelet may be leveraged to provide communication of information with respect to wireless devices detected by the detection device. Additionally or alternatively, a transmitter for use exclusively by the detection device may be utilized. Embodiments of the invention provide for a physical link between the detection device and a host system, such as to periodically download information from the detection device and/or to upload to the detection device.

Information provided by the aforementioned detection devices may be utilized according to embodiments of the present invention to optimize operation of an information processing platform with respect to wireless devices within a controlled environment facility. For example, a detection device may provide information with respect to an identity of a wireless device (e.g., an ESN, MIN, electronic address, URL, IP address, etcetera) in order for an information processing platform of the present invention to provide instructions to a wireless communication network access point that call to and from the wireless device are to be processed by the information processing platform. Additionally or alternatively, a detection device may provide information with respect to the location of a wireless device in order for infrastructure, such as wireless communication network access points, wireless communication nodes, antennas, etcetera may be deployed or adjusted to intercept communications of the wireless device.

Embodiments of the invention have been described with reference to registered and non-registered wireless communication devices. Registration of wireless communication devices for use in providing wireless communications in a controlled environment facility provides several advantages. For example, a particular individual (e.g., prisoner) may be associated with a registered device for accounting, accountability, and privileges purposes. Moreover, requiring registration of wireless devices may be utilized to control the particular wireless devices used in the controlled environment facility, such as to prevent the use of certain features, technologies, etcetera.

Registration of a wireless device according to embodiments of the invention may comprises presenting a user's wireless device (or appropriate information associated therewith, such as make, model, ESN, MIN, electronic address, software version, etcetera) to appropriate personnel for entry of information into information processing platform 210. Alternatively, registration of a wireless device according to embodiments of the invention may comprise a user obtaining an approved wireless communication device from a vendor approved by the controlled environment facility, such as a commissary provider.

According to embodiments of the invention, wireless communication services may continue to be offered and provided to residents of the controlled environment facility using a registered wireless communication device by the service provider after the resident leaves the controlled environment facility. Accordingly, not only may wireless communications be facilitated in association with a controlled environment facility according to the present invention, but wireless communications independent of the controlled environment facility may also be facilitated.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A system comprising:
   a multi-path mesh network of wireless nodes, wherein said network of wireless nodes comprises a plurality of wireless nodes disposed to passively monitor RF signals emitted from wireless devices within at least a portion of a controlled environment facility; and
   an information processing platform separate from and in communication with said network of wireless nodes and operable to process information provided by one or more of said wireless node, and provide location information specific to an unauthorized wireless device disposed in said controlled environment facility, wherein said one or more wireless node is further adapted to alert one or more neighboring wireless node, upon detection of a signal from said unauthorized wireless device, said one or more neighboring wireless node being a part of said network of wireless nodes, the unauthorized wireless device being identified as such through a comparison between identification information corresponding to the unauthorized wireless device and identification information corresponding to one or more wireless devices registered with the information processing platform.

2. The system of claim 1, wherein said one or more wireless nodes of said plurality of wireless nodes is adapted to detect signals emitted from a plurality of wireless device configurations.

3. The system of claim 2, wherein said plurality of wireless device configurations comprise at least two of a cellular telephone, a personal digital assistant, a wireless network device, a two-way pager, and a press-to-talk personal communication services device.

4. The system of claim 1, wherein said one or more wireless node is adapted to wake up one or more neighboring wireless node upon detection of a signal from said unauthorized wireless device.

5. The system of claim 4, wherein said one or more wireless node and said one or more neighboring wireless node cooperate to route data to said information processing platform.

6. The system of claim 5, wherein said data is routed to said information processing platform via a gateway wireless node.

7. The system of claim 1, wherein said one or more wireless node and said one or more neighboring wireless node are further adapted to collect data associated with said signal.

8. The system of claim 7, wherein said data comprises signal strength.

9. The system of claim 7, wherein said data comprises relative delay.

10. The system of claim 7, wherein said data comprises information with respect to an approximate location of said unauthorized wireless device.

11. The system of claim 1, wherein said information processing platform uses said location of said unauthorized wireless device to optimize operation of said information processing platform with respect to wireless devices within said controlled environment facility.

12. The system of claim 11, wherein said optimizing comprises deploying additional wireless nodes in strategic locations of said controlled environment facility, said additional wireless nodes deployed as part of said network of wireless nodes.

13. The system of claim 1, wherein said plurality of wireless nodes alternate between awake and sleep modes to conserve power.

14. The system of claim 1, wherein said plurality of wireless nodes are deployed within said controlled environment facility.

15. The system of claim 1, wherein said controlled environment facility comprises a prison facility.

16. A method comprising:
    detecting a signal emitted by an unauthorized wireless device using one or more wireless node, wherein said one or more wireless node is part of a multi-path mesh network of a plurality of wireless nodes that passively monitor RF signals emitted from wireless devices within at least a portion of a controlled environment facility, the unauthorized wireless device being identified as such by comparing identification information corresponding to the unauthorized wireless device with identification information corresponding to one or more wireless devices registered with the controlled environment facility;
    alerting one or more neighboring wireless node, using said one or more wireless node, to prompt said one or more neighboring wireless node to aid in locating said unauthorized wireless device, wherein said one or more neighboring wireless node are part of said network of wireless nodes;
    collecting data associated with said signal, wherein said data associated with said signal is collected by said one or more wireless node and said one or more neighboring wireless node; and
    determining the location of said unauthorized wireless device using said data.

17. The method of claim 16, further comprising:
    deploying said one or more wireless node within said controlled environment facility to detect said signal and collect said data.

18. The method of claim 16, further comprising:
    waking up one or more neighboring wireless node in sleep mode using said one or more wireless node, wherein said one or more neighboring wireless node are part of said network of wireless nodes.

19. The method of claim 16, wherein said data comprises signal strength.

20. The method of claim 16, wherein said data comprises relative delay.

21. The method of claim 16, wherein said one or more wireless node determine the location of said unauthorized wireless device using said data.

22. The method of claim 16, further comprising:
    routing said data to an information processing platform using said one or more wireless node and said one or more neighboring wireless node and separate from the wireless nodes.

23. The method of claim 22, wherein said data is routed to said information processing platform via a gateway wireless node.

24. The method of claim 23, wherein said information processing platform determines the location of said unauthorized wireless device using said data.

25. The method of claim 16, wherein said plurality of wireless nodes in said network of wireless nodes alternate between awake and sleep modes.

26. The method of claim 16, wherein said plurality of wireless nodes in said network of wireless nodes operate under the ZigBee communications protocols.

27. The method of claim 16, wherein said one or more wireless node are operable to detect a plurality of unauthorized wireless devices, said plurality of unauthorized wireless devices comprising various types of wireless devices.

28. The method of claim 27, wherein said unauthorized wireless devices comprise at least two of a cellular telephone, a personal digital assistant, a wireless network device, a two-way pager, and a press-to-talk personal communication services device.

29. The method of claim 16, wherein said controlled environment facility comprises a prison facility.

30. A system comprising:
a multi-path mesh network of a plurality of wireless nodes disposed to passively monitor RF signals emitted from wireless devices within at least a portion of a controlled environment facility, each of the plurality of wireless nodes operating in either an awake mode or sleep mode, upon detection of an unauthorized wireless device the wireless nodes activate one or more neighboring wireless nodes, the one or more neighboring wireless node being part of said network of wireless nodes, wherein said wireless nodes are further adapted to alert one or more neighboring wireless node to prompt said one or more neighboring wireless node to aid in locating said unauthorized wireless device, the unauthorized wireless device being identified as such through a comparison between identification information corresponding to the unauthorized wireless device and identification information corresponding to one or more wireless devices registered with the controlled environment facility.

31. The system of claim 30, wherein said one or more wireless device comprises a plurality of wireless devices, said plurality of wireless devices comprising various types of wireless devices.

32. A method comprising:
detecting an unauthorized wireless device using one or more wireless node disposed to monitor at least a portion of a controlled environment facility, wherein said one or more wireless node is part of a multi-path mesh network of wireless nodes deployed in association with said controlled environment facility, the wireless nodes passively monitor RF signals emitted from wireless devices, the unauthorized wireless device being identified as such by comparing identification information corresponding to the unauthorized wireless device with identification information corresponding to one or more wireless devices registered with the controlled environment facility;
intercepting a wireless communication placed from or to said unauthorized wireless device using at least one wireless node disposed to illuminate at least a portion of said controlled environment facility, wherein said at least one wireless node is part of said network of wireless nodes;
alerting one or more neighboring wireless node using said one or more wireless node to prompt said one or more neighboring wireless node to aid in locating said unauthorized wireless device, wherein said one or more neighboring wireless node is part of said network of wireless nodes; and
collecting data associated with said signal using said one or more wireless node and said one or more neighboring wireless node.

33. The method of claim 32, further comprising:
determining the location of said unauthorized wireless device using an information processing platform separate from the wireless nodes, wherein said location of said unauthorized wireless device is used to facilitate said intercepting said wireless communication placed from or to said unauthorized wireless device.

34. The method of claim 32, further comprising:
controlling at least one aspect of said intercepted wireless communication using an information processing platform separate from the wireless nodes, said information processing platform providing communication control features unique to controlling communications associated with a controlled environment facility, said controlling at least one aspect of said wireless communication implementing a communication control feature of said communication control features.

35. The method of claim 34, wherein said controlling at least one aspect of said wireless communication comprises completing said wireless communication under control of said communication processing platform.

36. The method of claim 35, further comprising:
at least one of, under control of said communication processing platform, verifying said wireless communication is being placed to an allowed number, recording at least a portion of said wireless communication, monitoring at least a portion of said wireless communication, locating said unauthorized wireless device associated with said wireless communication, and re-routing said wireless communication.

37. The method of claim 34, wherein said controlling at least one aspect of said wireless communication comprises:
blocking said wireless communication under control of said communication processing platform.

38. The method of claim 37, further comprising:
at least one of, under control of said communication processing platform, determining said wireless communication is being placed to a disallowed number, determining said communication is being placed from an unauthorized location, and determining said communication is being placed at an unauthorized time.

* * * * *